(No Model.)
2 Sheets—Sheet 1.

J. S. PIPER.
MACHINE FOR CUTTING CIRCULAR PIECES FROM LUMBER OR OTHER MATERIALS.

No. 475,247.
Patented May 17, 1892.

(No Model.) 2 Sheets—Sheet 2.

J. S. PIPER.
MACHINE FOR CUTTING CIRCULAR PIECES FROM LUMBER OR OTHER MATERIALS.

No. 475,247. Patented May 17, 1892.

Witnesses
Samuel Ker.
Philip C. Masi.

Inventor
J. S. Piper
by E. W. Anderson
his Attorney

UNITED STATES PATENT OFFICE.

JAMES S. PIPER, OF LOUISVILLE, KENTUCKY, ASSIGNOR OF ONE-HALF TO C. H. JENKINS, OF SAME PLACE.

MACHINE FOR CUTTING CIRCULAR PIECES FROM LUMBER OR OTHER MATERIALS.

SPECIFICATION forming part of Letters Patent No. 475,247, dated May 17, 1892.

Application filed June 30, 1891. Serial No. 398,052. (No model.)

*To all whom it may concern:*

Be it known that I, JAMES S. PIPER, a citizen of the United States, and a resident of Louisville, in the county of Jefferson and State of Kentucky, have invented certain new and useful Improvements in Machines for Cutting Circular Pieces from Lumber or other Materials; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
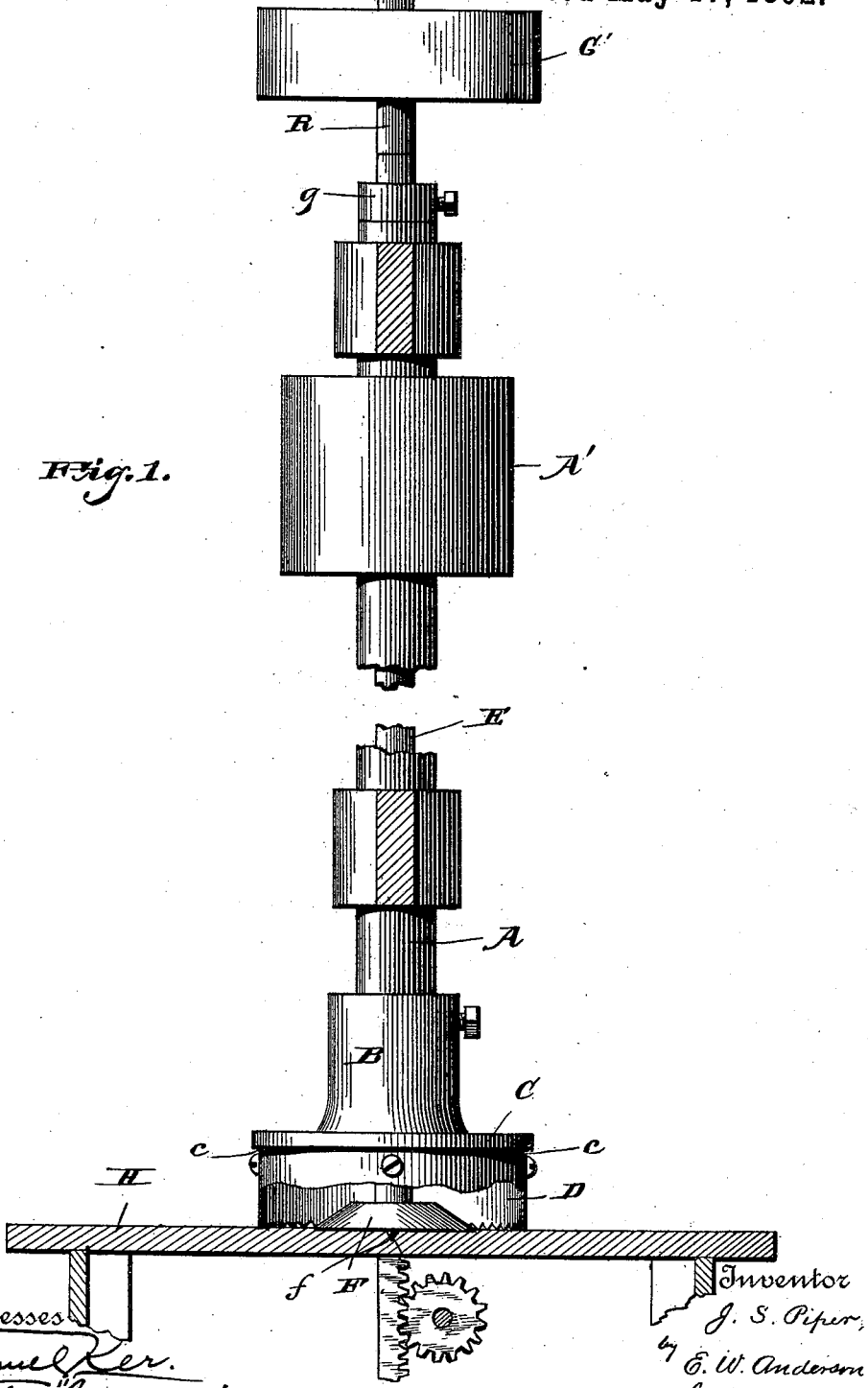
Figure 2:
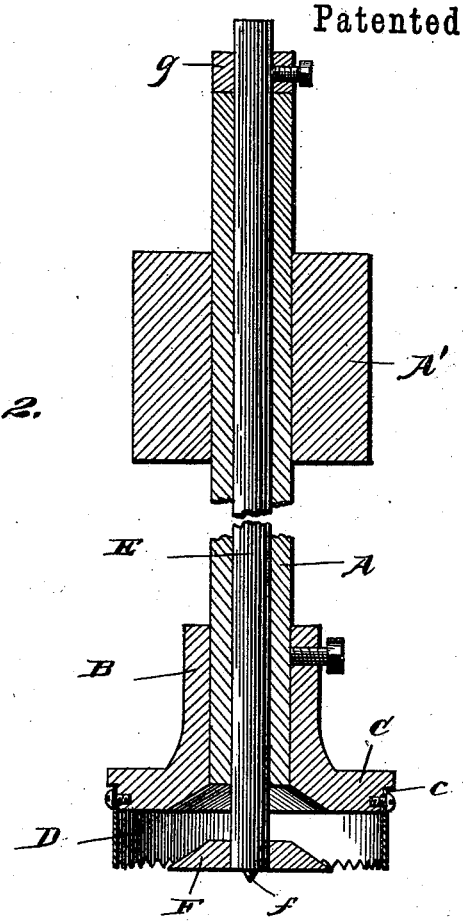
Figure 3:
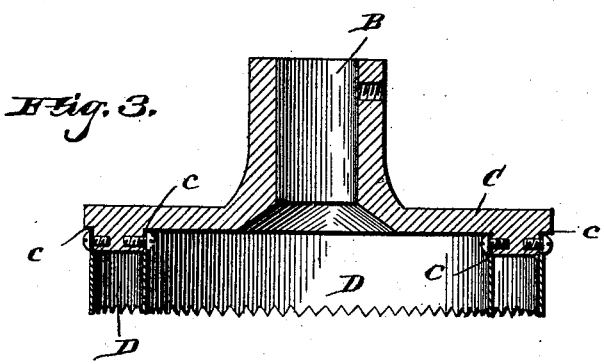

Figure 1 of the drawings is an elevation, part being in section. Fig. 2 is a vertical section. Fig. 3 is a modification in section.

This invention has relation to certain new and useful machines for the purpose of cutting circular heads, fellies, wheels, or disks from lumber or other suitable material; and the invention consists in the novel construction and combination of parts, as hereinafter specified.

In the accompanying drawings, the letter A designates a hollow vertically-mounted rotary shaft having suitable bearings in a supporting-frame and driven by a pulley A' thereon or by other suitable gear. Keyed or otherwise suitably secured upon this shaft at its lower portion is the hub B, having the flange C at its lower end formed with a surrounding shoulder $c$, to which is suitably secured the circular band-saw D, presenting its teeth in a plane at right angles to that of the rotation of the hub.

In the hollow shaft A is a shaft E, projecting beyond either end of said shaft A and arranged to reciprocate vertically therein. The lower end of this shaft E has a foot or extension F and terminates at its central portion in the point $f$. At the upper end is an adjustable set collar $g$, by means of which said shaft is supported and held at the proper adjustment.

R designates a weight-shaft carrying a weight G', said shaft being held vertically over the projecting upper end of the central shaft E and having its lower portion adapted to come in contact with and bear upon the said upper end of shaft E, said shaft also being capable of a vertically-reciprocating movement in its bearing supports or guides.

H designates a suitable table provided with means for its parallel vertical reciprocation and having its upper surface lying in a plane at right angles to the direction of the teeth of the saw and parallel with the rotary path thereof. The blank or material from which the desired article is to be cut is placed upon this table, which is raised to bring the upper surface of the piece in contact with the saw-teeth until they have cut its entire thickness, when said table is lowered. As the stick or material is brought into contact with the saw it is engaged by the point $f$ on the shaft E and firmly held in place. As the vertical movement of the table continues it will be seen that the said shaft, with the weight-shaft and weight, will be carried upwardly, the lower face of the hub being recessed to receive the foot F. When the table is lowered, the weight-shaft will force shaft E downwardly, discharging the disk or other article from the saw and permitting the operation to be continued.

In Fig. 3 I have shown the hub as having two shoulders $c$, to each of which is secured a circular band-saw of a different diameter, parallel one with the other, arranged concentrically, and separated from each other by a distance equal to the diameter of the rim or felly to be cut. It will be apparent that several concentric saws of different diameters may be carried by the hub, if it is desired.

I wish it to be understood that instead of mounting my machine in vertical position, as above described, it may by slight mechanical changes be arranged horizontally.

The objection heretofore in machines for this purpose, in which is employed a rotary cutter-head carrying a circular cutter with a knife-edge, has been that the blades could not be made thin enough to cut out the heads or disks with a straight edge, but have to be made so thick that it causes them to be cut with a beveled or concave edge, as the knife would cut a V-shaped groove. It is also difficult in this construction to keep the knife set so as to make all the heads the same size.

By my use of saws, as above described, the heads or other articles are cut all the same size and with a perfectly-square edge, at the same time cutting them with greater rapidity and with less waste.

Having described this invention, what I claim as new, and desire to secure by Letters Patent, is—

The herein-described machine for circular cutting, said machine comprising a vertically-movable table, a hollow rotary shaft mounted in bearings above said table, a hub or wheel B, secured to the lower portion of said shaft, one or more circular saws carried by said hub or wheel, a shaft E within said hollow shaft and also capable of a vertically-reciprocating movement thereon, and an independent weight-shaft R, supported above the upper end of said shaft E and designed to contact therewith, substantially as specified.

In testimony whereof I affix my signature in presence of two witnesses.

JAMES S. PIPER.

Witnesses:
   HARRY STUCKY,
   EMILE VAN OVERBEKE.